United States Patent
Han et al.

(10) Patent No.: US 9,538,524 B2
(45) Date of Patent: Jan. 3, 2017

(54) PHYSICAL DOWNLINK SHARED CHANNEL TRANSMISSION METHOD AND SYSTEM

(71) Applicant: ZTE Corporation, Shenzhen, Guangdong (CN)

(72) Inventors: Xiaogang Han, Shenzhen (CN); Bo Dai, Shenzhen (CN); Wei Gou, Shenzhen (CN); Shuqiang Xia, Shenzhen (CN); Zhisong Zuo, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/424,271

(22) PCT Filed: Aug. 22, 2013

(86) PCT No.: PCT/CN2013/082109
§ 371 (c)(1),
(2) Date: Mar. 17, 2015

(87) PCT Pub. No.: WO2014/032544
PCT Pub. Date: Mar. 6, 2014

(65) Prior Publication Data
US 2015/0223216 A1    Aug. 6, 2015

(30) Foreign Application Priority Data
Sep. 3, 2012 (CN) .......................... 2012 1 0321711

(51) Int. Cl.
*H04W 4/00* (2009.01)
*H04W 72/04* (2009.01)
*H04L 5/00* (2006.01)

(52) U.S. Cl.
CPC .......... *H04W 72/044* (2013.01); *H04L 5/0053* (2013.01); *H04W 72/0466* (2013.01)

(58) Field of Classification Search
CPC combination set(s) only.
See application file for complete search history.

(56) References Cited

U.S. PATENT DOCUMENTS

| | | | |
|---|---|---|---|
| 2011/0085503 A1* | 4/2011 | Nam | H04B 7/0452 370/329 |
| 2012/0147773 A1 | 6/2012 | Kim | |

(Continued)

FOREIGN PATENT DOCUMENTS

| | | |
|---|---|---|
| CN | 101222250 A | 7/2008 |
| CN | 101827444 A | 9/2010 |

(Continued)

OTHER PUBLICATIONS

International Search Report in international application No. PCT/CN2013/082109, mailed on Oct. 31, 2013.

(Continued)

*Primary Examiner* — Bob Phunkulh
(74) *Attorney, Agent, or Firm* — Oppedahl Patent Law Firm LLC

(57) ABSTRACT

Disclosed is a physical downlink shared channel transmission method, and the method includes: a network side determines transmission parameters of a Physical Downlink Shared Channel (PDSCH) according to a relevant transmission mode of a DM-RS and/or relevant information of a scheduled UE, wherein the transmission parameters include one or more of: a resource mapping approach of the PDSCH, a downlink DM-RS antenna port in use, and a Scrambling Code Identity (SCID) and a scrambling code initialized value X desired when a downlink DM-RS port sequence is initialized; and the network side transmits data according to the determined antenna parameters of the PDSCH. Further disclosed is a physical downlink shared channel transmission system. The disclosure can implement selection of DM-RS antenna ports and use multiple DM-RS antenna (Continued)

ports to improve transmission reliability, eliminate interference, increase MU-MIMO multiplexing capacity and improve frequency selective gain.

18 Claims, 3 Drawing Sheets

(56) References Cited

U.S. PATENT DOCUMENTS

| | | | | |
|---|---|---|---|---|
| 2012/0275400 A1* | 11/2012 | Chen | ............. | H04J 11/0033 370/329 |
| 2012/0327795 A1* | 12/2012 | Mallik | ............. | H04B 17/345 370/252 |
| 2013/0028134 A1 | 1/2013 | Wang et al. | | |
| 2013/0034064 A1* | 2/2013 | Nam | ............. | H04W 72/1294 370/329 |
| 2013/0039284 A1 | 2/2013 | Marinier et al. | | |
| 2014/0036747 A1* | 2/2014 | Nory | ............. | H04W 72/0406 370/311 |
| 2014/0233481 A1* | 8/2014 | Feng | ............. | H04L 5/0055 370/329 |
| 2015/0085766 A1* | 3/2015 | Kim | ............. | H04L 5/0041 370/329 |

FOREIGN PATENT DOCUMENTS

| | | |
|---|---|---|
| CN | 102083223 A | 6/2011 |
| WO | 2012109542 A1 | 8/2012 |

OTHER PUBLICATIONS

English Translation of the Written Opinion of the International Search Authority in international application No. PCT/CN2013/082109, mailed on Oct. 31, 2013.
Evolved Universal Terrestrial Radio Access (E-UTRA) Jun. 26, 2012.
Inclusion of Rel-11 features Aug. 17, 2012.
Discussion on Transmission Mode for Downlink CoMP Aug. 5, 2012.
DM-RS enhancements for CoMP Mar. 29, 2012.
Supplementary European Search Report in European application No. 13834196.1, mailed on Jul. 10, 2015.

* cited by examiner

PHYSICAL DOWNLINK SHARED CHANNEL TRANSMISSION METHOD AND SYSTEM

TECHNICAL FIELD

The disclosure relates to the field of wireless communications, and in particular to a Physical Downlink Shared Channel (PDSCH) transmission method and system.

BACKGROUND

In wireless communication techniques, when a base station side (for example an Evolved Node BeNB) transmits data through multiple antennas, data transmission rate can be improved through spatial multiplexing, i.e., transmitting different data at different antenna locations using same time-frequency resources on the transmission end, and a reception end (for example a User Equipment UE) also use multiple antennas to receive the data. In the case of a single user, resources of all antennas are assigned to a same user, the user occupies exclusively, during a transmission interval, physical resources assigned by the base station side, this transmission mode is referred to as Single User Multiple-Input Multiple-Out-put (SU-MIMO); in the case of multiple users, spatial resources of different antennas are assigned to different users, one user and at least one other user share, during a transmission interval, physical resources assigned by the base station side, and the way of sharing can be SDMA or space division multiplexing, this transmission mode is referred to as Multiple User Multiple-Input Multiple-Out-put (MU-MIMO), wherein the physical resources assigned by the base station side refer to time-frequency resources.

Standards of Long-Term Evolution (LTE) define a Physical Downlink Control Channel (PDCCH) configured to carry Downlink Control Information (DCI) including uplink/downlink scheduling information and uplink power control information. Formats of DCI in LTE Release 10 include: DCI format 0, DCI format 1, DCI format 1A, DCI format 1B, DCI format 1C, DCI format 1D, DCI format 2, DCI format 2A, DCI format 2B, DCI format 2C, DCI format 3, DCI format 3A and DCI format 4. With the development of CoMP techniques, LTE Release 11 puts forward an enhanced PDCCH, namely ePDCCH, the time domain starting position and frequency domain starting position of which are quite different from those of the PDCCH.

LTE also defines Transmission Mode (TM) selected by each UE PDSCH transmission. At present, Release 10 defines 9 transmission modes including TM 1 to TM 9, wherein the DCI Format 1A, serving as a fallback for each transmission mode, is mainly used when channel measurement is not reliable.

In addition, in LTE Release 10, the MIMO transmission mode uses by default a Demodulation Reference Signal (DM-RS) as a pilot carrier for demodulation, and a UE needs to acquire the position of the pilot carrier so that channel and interference estimation can be made on the pilot carrier; at a starting of a subframe, an initialized value of a DM-RS sequence is $c_{init}=(\lfloor n_s/2 \rfloor+1) \cdot (2N_{ID}^{cell}+1) \cdot 2^{16}+n_{SCID}$, wherein $n_{SCID}$ represents a Scrambling Identity (SCID) configured to support two different scrambling sequences, and the eNB can assign these two scrambling sequences to different users so that a same resource can be multiplexed by multiple users; $N_{ID}^{cell}$ represents a cell Identity (ID) with values being integers between 0 and 503; as the development CoMP techniques, LTE Release 11 puts forward enhancement of the DM-RS, which exhibits that the initialized value of the DM-RS sequence is changed to:

$C_{init}=(\lfloor n_s/2 \rfloor+1) \cdot (2X+1) \cdot 2^{16}+n_{SCID}$, wherein a scrambling initialized value X is a scrambling initialized value used when the DM-RS sequence is initialized, it can take two values x(0) and x(1), x(n) takes an integer between 0 and 503, which is configured by a higher layer.

With the development of LTE-A carrier aggregation techniques, LTE R11 puts forward a new type of carrier, which is still under discussion, it can be determined that for the new carrier, a single port Cell Reference Signal (CRS) according to LTE R8/R9/R10, which has a period of 5 ms, is used to perform synchronous tracking, and in a transmission mode, demodulation is performed based on the DM-RS, and channel measurement is performed based on the CSI-RS; it is determined that DCI Format 1A and DCI format 2C can be used in scheduling of a PDSCCH, and transmission modes supported in Coordinated Multi-Point (COMP) are specified and it is specified that DCI format must be supported in the newly added carrier, thus it can be learned that the enhancement of the DM-RS is also desired to be supported in the newly added carrier.

At present, for transmission of new carriers, it is specified that the DCI Format 1A schedules a PDSCH of the UE using an approach of single DM-RS antenna port transmission, but a specific DM-RS antenna port is not specified, and multiple DM-RS antenna ports are needed for implementing PDSCH transmission diversity to ensure the reliability of transmission in the future; for reasons of interference elimination and increase of multiplexing capacity for MU-MIMO, it is desired to select dynamically transmission parameters of the PDSCH such as a DM-RS antenna port in use, and an SCID and a scrambling code initialized value X desired when a DM-RS port sequence is initialized. However, so far no new PDSCH transmission method has been proposed by related techniques so as to solve problems such as selection of DM-RS antenna ports, improvement on transmission reliability using multiple DM-RS antenna ports, interference elimination, increasing of multiplexing capacity and improvement on frequency selective gain.

SUMMARY

In view of the above, the disclosure is intended to provide a physical downlink shared channel transmission method and system, which can implement selection of DM-RS antenna ports and use multiple DM-RS antenna ports to improve transmission reliability, eliminate interference, increase MU-MIMO multiplexing capacity and improve frequency selective gain.

To this end, the technical solutions of embodiments of the disclosure are implemented as follows.

A physical downlink shared channel transmission method, including:

a network side determines transmission parameters of a Physical Downlink Shared Channel (PDSCH) according to a relevant transmission mode of a DM-RS and/or relevant information of a scheduled UE, wherein the transmission parameters include one or more of: a resource mapping approach of the PDSCH, a downlink DM-RS antenna port in use, and a Scrambling Code Identity (SCID) and a scrambling code initialized value X desired when a downlink DM-RS port sequence is initialized; and the network side transmits data according to the determined transmission parameters of the PDSCH.

The method may further include:

the network side notifies a terminal of the transmission parameters of the PDSCH, and/or the terminal determines the transmission parameters of the PDSCH according to the relevant information of the scheduled UE; and the terminal receives data according to the transmission parameters of the PDSCH notified by the network side and/or the transmission parameters of the PDSCH determined according to the relevant information of the scheduled UE.

The network side notifies a terminal of the transmission parameters of the PDSCH may include: the terminal is notified of the transmission parameters of the PDSCH through physical layer downlink control signaling information and/or higher layer signaling information.

The relevant transmission mode of the DM-RS may include transmission mode 9 and/or transmission mode 10 and/or other more advanced versions of transmission modes that use the DM-RS as a basic demodulation reference signal; and the relevant information of the scheduled UE may include one or more of: a DM-RS antenna port used by an enhanced Physical Downlink Control Channel (ePDCCH) to schedule the UE, a subframe type of subframes occupied by the UE, a subframe index of the subframes occupied by the UE, a cell ID of a cell where the UE is located, an index to scheduled PDSCH physical resource blocks (PRBs) of the UE, a Cell Radio Network Temporary Identifier (C-RNTI) assigned to the UE, an ID of the UE (UE ID) and a UE-specific offset parameter.

The network side determines the resource mapping approach of the PDSCH may include: the resource mapping approach of the PDSCH is determined according to Channel State Information (CSI), and the resource mapping approach of the PDSCH comprises:

the PDSCH is mapped to one or more continuous PRBs of a same subframe;

or the PDSCH is mapped to a plurality of discrete PRBs, in two slots of a same subframe, the PRBs correspond to same frequency domain positions, and the PDSCH is based on a single antenna port transmission mode or a multi-antenna port transmission mode;

or the PDSCH is mapped to discrete PRB resources, in two slots of a same subframe, wherein the PRBs correspond to same frequency domain positions, and assignment of the discrete PRB resources is limited to two clusters, i.e., two segments of Resource Blocks (RBs), with each cluster comprising one or more continuous Resource Block Groups (RBGs).

The physical layer downlink control signaling may include DCI Format 1A, and newly added DCI Format 1E and/or DCI Format 1F.

When the DCI Format 1A is used, the transmission parameters of the PDSCH may be optimized through a Localized/Distributed Virtual Resource Block (VRB) assignment indicator bit in the DCI Format 1A and/or an available Modulation and Coding Scheme (MCS) indicator bit.

The transmission parameters of the PDSCH are optimized through a

Localized/Distributed VRB assignment indicator bit in the DCI Format 1A and/or an available MCS indicator bit may include one or more of:

when the SCID and the value X are default values, the DM-RS antenna port is indicated dynamically through the Localized/Distributed VRB assignment indicator bit in the DCI Format 1A;

when the DM-RS antenna port is a default one, the SCID and the value X when the antenna port is initialized are indicated dynamically through the Localized/Distributed VRB assignment indicator bit in the DCI Format 1A;

when a transmission block carried by the PDSCH is a retransmission block, at least one of the DM-RS antenna port, the SCID and the value X are indicated dynamically through the Localized/Distributed VRB assignment indicator bit in the DCI Format 1A and/or the available MCS indicator bit, with the rest being default values;

two DM-RS antenna ports are indicated through the Localized/Distributed VRB assignment indicator bit in the DCI Format 1A, wherein both of sequential numbers of two indicated antenna ports are odd numbers or even numbers, or the two indicated antenna ports are ports having a fixed sequential number; or the resource mapping approach of the PDSCH is selected through the Localized/Distributed VRB assignment indicator bit in the DCI Format 1A.

After the physical resource mapping of the PDSCH, selection of antenna parameters in assigned PRBs may include at least one of:

same antenna parameters are configured for the PRBs, wherein the same antenna parameters are selected from specified antenna parameters or determined in an implication way;

corresponding antenna parameters are configured independently for different PRBs, wherein the antenna parameters are selected from specified antenna parameters or determined in an implication way;

corresponding antenna parameters are configured independently for different clusters, with different PRBs in one cluster configured with same antenna parameters, wherein the antenna parameters are selected from specified antenna parameters or determined in an implication way; and wherein the antenna parameters comprise a DM-RS antenna port, and an SCID and a scrambling code initialized value X desired when a DM-RS port sequence is initialized.

Antenna parameters used by a PDSCH of the scheduled UE may be implicitly determined according to different types of subframes, the antenna parameters comprise a DM-RS antenna port, and an SCID and a scrambling code initialized value X desired when a DM-RS port sequence is initialized, and the different types of subframes comprise one or more of: a subframe corresponding to a case in which a newly added TDD special subframe configuration uses a normal cyclic prefix; a subframe corresponding to a case in which the newly added TDD special subframe configuration uses an extended cyclic prefix, a subframe corresponding to configurations other than the newly added TDD configuration, an MBSFN subframe or an ordinary subframe.

The newly added TDD special subframe configuration may include:

a newly added TDD special subframe configuration is 9, i.e., (DwPTS:GP:UpPTS)=(6:6:2), when a DwPTS of the TDD special subframe uses a normal cyclic prefix;

or, a newly added TDD special subframe configuration is 7, i.e., (DwPTS:GP:UpPTS)=(5:5:2), when the DwPTS of the TDD special subframe uses an extended cyclic prefix.

Antenna parameters used by a PDSCH scheduled by the DCI Format 1A may be implicitly determined using antenna parameters corresponding to the ePDCCH when the UE is scheduled, the antenna parameters comprise a DM-RS antenna port, and an SCID and a scrambling code initialized value X desired when a DM-RS port sequence is initialized.

A physical downlink shared channel transmission method, including a network equipment, wherein the network equipment is configured to determine transmission parameters of a Physical Downlink Shared Channel (PDSCH) according to a relevant transmission mode of a DM-RS and/or relevant information of a scheduled UE, and transmit data according the determined transmission parameters of the PDSCH, wherein the transmission parameters include one or more of: a resource mapping approach of the PDSCH, a downlink DM-RS antenna port in use, and a Scrambling Code Identity (SCID) and a scrambling code initialized value X desired when a downlink DM-RS port sequence is initialized.

The physical downlink shared channel transmission method may further include a terminal, wherein the network equipment is further configured to notify the terminal of the transmission parameters of the PDSCH; and the terminal is configured to receive data according to the transmission parameters of the PDSCH notified by the network equipment and/or the transmission parameters of the PDSCH determined according to the relevant information of the scheduled UE.

The network equipment notifies the terminal of the transmission parameters of the PDSCH may include: the terminal is notified of the transmission parameters of the PDSCH through physical layer downlink control signaling information and/or higher layer signaling information.

wherein the relevant transmission mode of the DM-RS comprises transmission mode 9 and/or transmission mode 10 and/or other more advanced versions of transmission modes that use the DM-RS as a basic demodulation reference signal; and the relevant information of the scheduled UE comprises one or more of: a DM-RS antenna port used by an enhanced Physical Downlink Control Channel (ePDCCH) to schedule the UE, a subframe type of subframes occupied by the UE, a subframe index of the subframes occupied by the UE, a cell ID of a cell where the UE is located, an index to scheduled PDSCH physical resource blocks (PRBs) of the UE, a Cell Radio Network Temporary Identifier (C-RNTI) assigned to the UE, an ID of the UE (UE ID) and a UE-specific offset parameter.

and the resource mapping approach of the PDSCH comprises:

the PDSCH is mapped to one or more continuous PRBs of a same subframe;

or the PDSCH is mapped to a plurality of discrete PRBs, and two slots of a same subframe, the PRBs correspond to same frequency domain positions, and the PDSCH is based on a single antenna port transmission mode or a multi-antenna port transmission mode;

or the PDSCH is mapped to discrete PRB resources, and two slots of a same subframe, the PRBs correspond to same frequency domain positions, and assignment of the discrete PRB resources is limited to two clusters, i.e., two segments of Resource Blocks (RBs), with each cluster comprising one or more continuous Resource Block Groups (RBGs).

The physical layer downlink control signaling may include DCI Format 1A, and newly added DCI Format 1E and/or DCI Format 1F.

When the DCI Format 1A is used, the transmission parameters of the PDSCH may be optimized through a Localized/Distributed Virtual Resource Block (VRB) assignment indicator bit in the DCI Format 1A and/or an available Modulation and Coding Scheme (MCS) indicator bit.

The transmission parameters of the PDSCH are optimized through a Localized/Distributed VRB assignment indicator bit in the DCI Format 1A and/or an available MCS indicator bit may include one or more of:

when the SCID and the value X are default values, the DM-RS antenna port is indicated dynamically through the Localized/Distributed VRB assignment indicator bit in the DCI Format 1A;

when the DM-RS antenna port is a default one, the SCID and the value X when the antenna port is initialized are indicated dynamically through the Localized/Distributed VRB assignment indicator bit in the DCI Format 1A;

when a transmission block carried by the PDSCH is a retransmission block, at least one of the DM-RS antenna port, the SCID and the value X are indicated dynamically through the Localized/Distributed VRB assignment indicator bit in the DCI Format 1A and/or the available MCS indicator bit, with the rest being default values;

two DM-RS antenna ports are indicated through the Localized/Distributed VRB assignment indicator bit in the DCI Format 1A, wherein both of sequential numbers of two indicated antenna ports are odd numbers or even numbers, or the two indicated antenna ports are ports having a fixed sequential number; or the resource mapping approach of the PDSCH is selected through the Localized/Distributed VRB assignment indicator bit in the DCI Format 1A.

After the physical resource mapping of the PDSCH, selection of antenna parameters in assigned PRBs may include at least one of:

same antenna parameters are configured for the PRBs, wherein the same antenna parameters are selected from specified antenna parameters or determined in an implication way;

corresponding antenna parameters are configured independently for different PRBs, wherein the antenna parameters are selected from specified antenna parameters or determined in an implication way;

corresponding antenna parameters are configured independently for different clusters, with different PRBs in one cluster configured with same antenna parameters, wherein the antenna parameters are selected from specified antenna parameters or determined in an implication way; and wherein the antenna parameters comprise a DM-RS antenna port, and an SCID and a scrambling code initialized value X desired when a DM-RS port sequence is initialized.

Antenna parameters used by a PDSCH of the scheduled UE may be implicitly determined according to different types of subframes, the antenna parameters comprise a DM-RS antenna port, and an SCID and a scrambling code initialized value X desired when a DM-RS port sequence is initialized, and the different types of subframes comprise one or more of: a subframe corresponding to a case in which a newly added TDD special subframe configuration uses a normal cyclic prefix; a subframe corresponding to a case in which the newly added TDD special subframe configuration uses an extended cyclic prefix, a subframe corresponding to configurations other than the newly added TDD configuration, an MBSFN subframe or an ordinary subframe.

The newly added TDD special subframe configuration may include:

a newly added TDD special subframe configuration is 9, i.e., (DwPTS:GP:UpPTS)=(6:6:2), when a DwPTS of the TDD special subframe uses a normal cyclic prefix;

or, a newly added TDD special subframe configuration is 7, i.e., (DwPTS:GP:UpPTS)=(5:5:2), when the DwPTS of the TDD special subframe uses an extended cyclic prefix.

Antenna parameters used by a PDSCH scheduled by the DCI Format 1A may be implicitly determined using antenna parameters corresponding to the ePDCCH when the UE is scheduled, the antenna parameters comprise a DM-RS antenna port, and an SCID and a scrambling code initialized value X desired when a DM-RS port sequence is initialized.

In the physical downlink shared channel transmission method and system according to the embodiment of the disclosure, a network side determines transmission parameters of a Physical Downlink Shared Channel (PDSCH) according to a relevant transmission mode of a DM-RS and/or relevant information of a scheduled UE, wherein the transmission parameters include one or more of: a resource mapping approach of the PDSCH, a downlink DM-RS antenna port in use, and a Scrambling Code Identity (SCID) and a scrambling code initialized value X desired when a downlink DM-RS port sequence is initialized; and the network side transmits data according to the determined antenna parameters of the PDSCH. The embodiment of the disclosure can implement selection of DM-RS antenna ports and use multiple DM-RS antenna ports to improve transmission reliability, eliminate interference, increase MU-MIMO multiplexing capacity and improve frequency selective gain.

DETAILED DESCRIPTION

Compared to compatible carriers, data demodulation of newly added types of carriers is based on DM-RS, measurement of the newly added types of carriers is based on CSI-RS, and it is also specified that the newly added types of carriers use DCI Format 1A and 2C to support PDSCH transmission. In the case of a same downlink bandwidth, compared to the DCI Format 2C, the DCI Format 1A needs much less bit loads, and transmission based on DM-RS antenna ports doesn't support a resource assignment approach of DVRB, thus in the DCI 1A of the newly added types of carriers, a bit field for indicating Localized/Distributed Virtual Resource Blocks (VRBs) can be optimized, and when a base station is required to retransmit downlink data to a UE, since at that point the DCI Format 1A for scheduling retransmitted resources doesn't need to indicate the size of a Transport Block (TB) being retransmitted, three bits reserved in a Modulation and Coding Scheme (MCS) indication field in the DCI Format 1A can be used for other purposes.

At present, for transmission of new carriers, it is specified that the DCI Format 1A schedules a PDSCH of the UE using an approach of single DM-RS antenna port transmission, but a specific DM-RS antenna port is not specified, and multiple DM-RS antenna ports are needed for implementing PDSCH transmission diversity to ensure the reliability of transmission in the future; for reasons of interference elimination and increase of multiplexing capacity for MU-MIMO, it is desired to select dynamically transmission parameters of the PDSCH such as a DM-RS antenna port in use, and an SCID and a scrambling code initialized value X desired when a DM-RS port sequence is initialized.

The new carriers are transmitted based on a DM-RS antenna port, thus the resource assignment approach of DVRB is not supported, but in channels having relatively large range of frequency selection, discrete resource assignment approaches can be used to improve frequency selective gain, thus it is desired to consider new methods for mapping frequency domain resources of a PDSCH.

Figure 1:
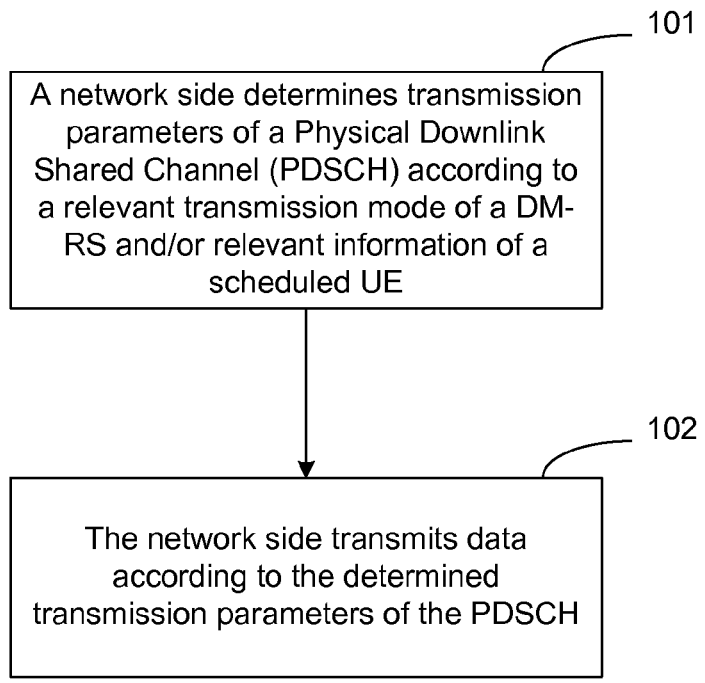
FIG. 1 is a schematic flow chart of a physical downlink shared channel transmission method according to an embodiment of the disclosure.

FIG. 1 is a schematic flow chart of a physical downlink shared channel transmission method according to an embodiment of the disclosure, as shown in FIG. 1, the method includes:

Step 101, a network side determines transmission parameters of a Physical Downlink Shared Channel (PDSCH) according to a relevant transmission mode of a DM-RS and/or relevant information of a scheduled UE;

Here the transmission parameters include one or more of: a resource mapping approach of the PDSCH, a downlink DM-RS antenna port in use, and a Scrambling Code Identity (SCID) and a scrambling code initialized value X desired when a downlink DM-RS port sequence is initialized.

Step 102, the network side transmits data according to the determined transmission parameters of the PDSCH.

Optionally, the method may further include:

the network side notifies a terminal of the transmission parameters of the PDSCH, and/or the terminal determines the transmission parameters of the PDSCH according to the relevant information of the scheduled UE; and the terminal receives data according to the transmission parameters of the PDSCH notified by the network side and/or the transmission parameters of the PDSCH determined according to the relevant information of the scheduled UE.

Optionally, the network side notifies a terminal of the transmission parameters of the PDSCH may include: the terminal is notified of the transmission parameters of the PDSCH through physical layer downlink control signaling information and/or higher layer signaling information.

It should be noted that the embodiment of the disclosure is applicable to PDSCHs for new carriers, and also applicable to CoMP PDSCHs. The above physical layer downlink control signaling may include DCI Format 1A, and newly added DCI Format 1E and/or DCI Format 1F.

Optionally, the relevant transmission mode of the DM-RS may include transmission mode 9 and/or transmission mode 10 and/or other more advanced versions of transmission modes that use the DM-RS as a basic demodulation reference signal.

Optionally, the relevant information of the scheduled UE may include one or more of: a DM-RS antenna port used by an enhanced Physical Downlink Control Channel (ePDCCH) to schedule the UE, a subframe type of subframes occupied by the UE, a subframe index of the subframes occupied by the UE, a cell ID of a cell where the UE is located, an index to scheduled PDSCH physical resource blocks (PRBs) of the UE, a Cell Radio Network Temporary Identifier (C-RNTI) assigned to the UE, an ID of the UE (UE ID) and a UE-specific offset parameter. Here the UE-specific offset parameter may include one or more of: an offset parameter of a subframe, an offset parameter of a scheduled PRB, and other parameters desired by the UE.

Optionally, the network side determines the resource mapping approach of the PDSCH may include: the resource mapping approach of the PDSCH is determined according to Channel State Information (CSI), and the resource mapping approach of the PDSCH may include:

the PDSCH is mapped to one or more continuous PRBs of a same subframe;

or the PDSCH is mapped to a plurality of discrete PRBs, and in two slots of a same subframe, the PRBs correspond to same frequency domain positions, and the PDSCH is based on a single antenna port transmission mode or a multi-antenna port transmission mode;

or the PDSCH is mapped to discrete PRB resources, and in two slots of a same subframe, the PRBs correspond to same frequency domain positions, and assignment of the discrete PRB resources is limited to two clusters, i.e., two segments of Resource Blocks (RBs), with each cluster comprising one or more continuous Resource Block Groups (RBGs), and here assigned discrete PRB resources can be indicated through respective indication of a starting RBG and an ending RBG for the assigned two clusters.

In the embodiment of the disclosure, one RBG includes P RBs, and the value of P is a function of downlink system bandwidth $N_{RB}^{DL}$.

| Downlink system bandwidth $N_{RB}^{DL}$ | RBG Size(P) |
|---|---|
| ≤10 | 1 |
| 11-26 | 2 |
| 27-63 | 3 |
| 64-110 | 4 |

It should be noted that the number of DM-RS antenna ports used by the PDSCH can be 1, 2 or 4.

It should be noted that the physical layer downlink control signaling may include DCI Format 1A, and newly added DCI Format 1E and/or DCI Format 1F.

Optionally, when the physical layer downlink control signaling uses the DCI Format 1A, the transmission parameters of the PDSCH may be optimized through a Localized/Distributed Virtual Resource Block (VRB) assignment indicator bit in the DCI Format 1A and/or an available Modulation and Coding Scheme (MCS) indicator bit (e.g., an MSC indicator bit reserved in the DCI Format 1A in the case that downlink data are desired to be retransmitted), and the specific optimization method includes one or more of:

when sequence mapping of a DM-RS antenna port is initialized, the SCID and the value X may take default values, the DM-RS antenna port is indicated dynamically through a Localized/Distributed VRB assignment bit field, for example being indicated as antenna port 7 or 8, so orthogonality during the resource mapping of the UE can be ensured and interferences therebetween is further lowered;

when a default DM-RS antenna port is used, the SCID and/or the value X when the antenna port is initialized are indicated dynamically through the Localized/Distributed VRB assignment indicator bit, wherein the value of SCID and that of X can be dependent or independent from each other;

when a transmission block carried by the PDSCH is a retransmission block, at least one of the DM-RS antenna port, the SCID and the value X are indicated dynamically through the Localized/Distributed VRB assignment bit in the DCI Format 1A and/or the available MCS indicator bit, with the rest being default values; for example, in a scenario when downlink data are desired to be retransmitted, the MCS indicator bit reserved in the DCI Format 1A can be used to indicate selection of DM-RS antenna port 7 or 8;

two DM-RS antenna ports are indicated through the Localized/Distributed VRB assignment indicator bit in the DCI Format 1A, wherein both of sequential numbers of two indicated antenna ports are odd numbers or even numbers, or the two indicated antenna ports are ports having a fixed sequential number; or the resource mapping approach of a physical downlink shared channel is selected through the Localized/Distributed VRB assignment bit in the DCI Format 1A. For the resource mapping approach of the physical downlink shared channel, refer to the resource mapping approach of the PDSCH described above.

Optionally, when sequence mapping of a DM-RS antenna port is initialized, the SCID and the value X may take default values, one DM-RS antenna port is selected dynamically, from multiple DM-RS antenna ports, as a antenna port during resource mapping of the UE, through the Localized/Distributed VRB assignment indicator bit in the DCI Format 1A and an MCS indicator bit reserved in the DCI Format 1A, in this way, the MU-MIMO capability of the system can be improved.

In order to further lower interference, transmission parameters of the UE during resource mapping can also be selected dynamically through the Localized/Distributed VRB assignment bit in the DCI Format 1A and an MCS indicator bit reserved in the DCI Format 1A, and the transmission parameters include one or more of an antenna port, an SCID value or a value X.

Or, in order to ensure the reliability of the UE during transmission, the UE employs diversity during PDSCH transmission, thus cases in which the number of antenna ports is 2 or 4 need to be considered as follows.

In the case that the number of antenna ports is 2, two default DM-RS antenna ports can be used, or two DM-RS antenna ports with their antenna port sequential numbers being odd or even numbers can also be indicated through the Localized/Distributed VRB assignment bit in the DCI Format 1A.

In the case that the number of antenna ports is 4, four default DM-RS antenna ports can be used, the SCID or the value X when the antenna port is initialized is indicated dynamically through the Localized/Distributed VRB assignment bit in the DCI Format 1A, wherein the value of SCID and that of X can be dependent or independent from each other.

Further, in the case that the number of antenna ports is 2 or 4, when sequence mapping of the DM-RS antenna ports is initialized, the SCID and the value X may take default values, and selected antenna ports can be indicated through the Localized/Distributed VRB assignment bit in the DCI Format 1A or a newly added bit; when downlink data is desired to be retransmitted, the selected antenna ports can be indicated through the Localized/Distributed VRB assignment bit in the DCI Format 1A and an MCS indicator bit reserved in the DCI Format 1A.

Besides the optimization of the transmission parameters of the PDSCH through the Localized/Distributed VRB assignment indicator bit in the DCI 1A and the MCS indicator bit reserved in the DCI Format 1A, relevant information of a scheduled UE can also be used to implicitly map antenna parameters of the PDSCH. For example, an antenna port corresponding to an ePDCCH can be used to implicitly determine a DM-RS antenna port scheduled by DCI 1A, if the UE detects an antenna port where the ePDCCH is located, then the UE considers by default that its scheduled PDSCH is located at an antenna port as same as that of the ePDCCH, here the range of antenna ports that can be used is between 7 and 10.

It is assumed that a subframe where scheduled resources of the UE are located is indexed to R1;

A sequential number of the UE-specific offset parameter is UE ID or C-RNTI, which is denoted as R2;

A PRB of a scheduled physical downlink shared channel of the UE is indexed to R3;

the indication signaling is R4;

selection of W ports at the most is supported, determination of a DM-RS antenna port of a physical downlink shared channel scheduled through the DCI Format 1A specifically includes:

a corresponding port is determined according to a remainder from R3 mod W, a remainder from (R3+R2+R1+R4) mod W, a remainder from R3 mod W, a remainder from (R3+R2+R4) mod W, a remainder from (R3+R1+R4) mod W, a remainder from (R3+R2) mod W, or a remainder from (R3+R4) mod W.

Optionally, after the physical resource mapping of the PDSCH, selection of a DM-RS antenna port for assigned PRBs may include at least one of:

same antenna parameters are configured for the PRBs, wherein the same antenna parameters are selected from specified antenna parameters or determined in an implication way;

antenna parameters are configured independently for different PRBs, wherein the antenna parameters are selected from specified antenna parameters or determined in an implication way;

antenna parameters are configured independently for different clusters, with different PRBs in one cluster configured with same antenna parameters, wherein the antenna parameters are selected from specified antenna parameters or determined in an implication way; and wherein the antenna parameters comprise a DM-RS antenna port, and an SCID and a scrambling code initialized value X desired when a DM-RS port sequence is initialized.

Optionally, antenna parameters used by a PDSCH of the scheduled UE may be implicitly determined according to different types of subframes, the antenna parameters comprise a DM-RS antenna port, and an SCID and a scrambling code initialized value X desired when a DM-RS port sequence is initialized, and the different types of subframes comprise one or more of: a subframe corresponding to a case in which a newly added TDD special subframe configuration uses a normal cyclic prefix; a subframe corresponding to a case in which the newly added TDD special subframe configuration uses an extended cyclic prefix, a subframe corresponding to configurations other than the newly added TDD configuration, an MBSFN subframe or an ordinary subframe.

Optionally, the newly added TDD special subframe configuration may include:

a newly added TDD special subframe configuration is 9, i.e., (DwPTS:GP:UpPTS)=(6:6:2), when a DwPTS of the TDD special subframe uses a normal cyclic prefix;

or, a newly added TDD special subframe configuration is 7, i.e., (DwPTS:GP:UpPTS)=(5:5:2), when the DwPTS of the TDD special subframe uses an extended cyclic prefix.

Optionally, antenna parameters used by a PDSCH scheduled by the DCI Format 1A may be implicitly determined using antenna parameters corresponding to the ePDCCH when the UE is scheduled, the antenna parameters comprise a DM-RS antenna port, and an SCID and a scrambling code initialized value X desired when a DM-RS port sequence is initialized.

Antenna ports during resource mapping of the UE can also be determined using different types of subframes, after the introduction of newly added TDD special subframe configuration, when a DwPTS of the TDD special subframe takes Normal CP, a newly added TDD special subframe configuration is 9, i.e., (DwPTS:GP:UpPTS)=(6:6:2), then DM-RS antenna ports 7-10 are supported; or, when the DwPTS of the TDD special subframe uses an extended CP, a newly added TDD special subframe configuration is 7, i.e., (DwPTS:GP:UpPTS)=(5:5:2), then the antenna port 5 is supported; as to an MBSFN subframe, the antenna port 7 is fixedly supported; and as to an ordinary subframe, the DM-RS single antenna port is fixedly used.

Besides the above indication of transmission parameters of the PDSCH through a relevant bit in the DCI Format 1A, the UE can also be notified of transmission parameters of the PDSCH through higher layer UE-specific signaling.

It should be noted that the resource mapping approach of the PDSCH includes: the PDSCH is mapped to one or more continuous PRBs of a same subframe, which is denoted as method 1; or the PDSCH is mapped to a plurality of discrete PRBs, in two slots of a same subframe, wherein the PRBs correspond to same frequency domain positions, and the PDSCH is based on a single antenna port transmission mode or a multi-antenna port transmission mode, which is denoted as method 2;

or the PDSCH is mapped to discrete PRB resources, in two slots of a same subframe, wherein the PRBs correspond to same frequency domain positions, and assignment of the discrete PRB resources is limited to two clusters, i.e., two segments of Resource Blocks (RBs), with each cluster including one or more continuous Resource Block Groups (RBGs); and assigned discrete PRB resources can be indicated through respective indication of a starting RBG and an ending RBG of the assigned two clusters, with each PRG including P RBs, wherein the value of P is a function of downlink system bandwidth $N_{RB}^{DL}$.

| Downlink system bandwidth $N_{RB}^{DL}$ | RBG Size(P) |
|---|---|
| ≤10 | 1 |
| 11-26 | 2 |
| 27-63 | 3 |
| 64-110 | 4 |

Herein, it is denoted as method 3.

The resource mapping approach of the PDSCH can be selected from a combination of any two from the method 1, the method 2 and the method 3 through the Localized/Distributed VRB assignment bit in the DCI Format 1A.

Selection of a DM-RS antenna port for the PDSCH in the method 2 and method 3 includes at least one of:

i. a predetermined approach: antenna ports used by different PRBs or clusters in assigned resources are selected from specified DM-RS antenna ports; and ii. an implicit mapping approach: antenna ports used by different PRBs or clusters in assigned resources are implicitly determined through a minimum (maximum) index of PRBs and an indication signaling of a scheduled PDSCH of the UE.

It should be noted that the above determination, by the base station side, of the transmission parameters of the PDSCH through predefined information is not only applicable to a PDSCH for new carriers, but also applicable to CoMP PDSCHs.

Figure 2:
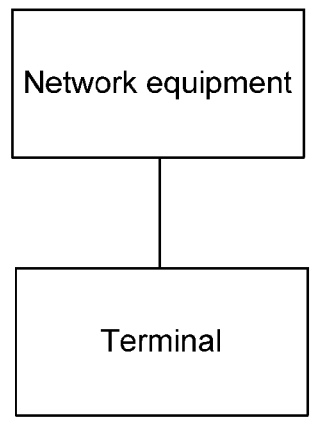
FIG. 2 is a schematic structural diagram of a physical downlink shared channel transmission system according to an embodiment of the disclosure.

The embodiment of the disclosure further discloses accordingly a PDSCH transmission system, and FIG. 2 is a schematic structural diagram of a physical downlink shared channel transmission system according to an embodiment of the disclosure, as shown in FIG. 2, the system include a network equipment, wherein the network equipment is configured to determine transmission parameters of a Physical Downlink Shared Channel (PDSCH) according to a relevant transmission mode of a DM-RS and/or relevant information of a scheduled UE, and transmit data according the determined transmission parameters of the PDSCH, wherein the transmission parameters include one or more of: a resource mapping approach of the PDSCH, a downlink DM-RS antenna port in use, and a Scrambling Code Identity (SCID) and a scrambling code initialized value X desired when a downlink DM-RS port sequence is initialized.

Optionally, the physical downlink shared channel transmission method may further include a terminal, wherein the network equipment is further configured to notify the terminal of the transmission parameters of the PDSCH; and the terminal is configured to receive data according to the transmission parameters of the PDSCH notified by the network equipment and/or the transmission parameters of the PDSCH determined according to the relevant information of the scheduled UE, here the transmission parameters include one or more of: a resource mapping approach of the PDSCH, a downlink DM-RS antenna port in use, and a Scrambling Code Identity (SCID) and a scrambling code initialized value X desired when a downlink DM-RS port sequence is initialized.

Optionally, the network equipment notifies a terminal of the transmission parameters of the PDSCH may include: the terminal is notified of the transmission parameters of the PDSCH through physical layer downlink control signaling information and/or higher layer signaling information.

Optionally, the relevant transmission mode of the DM-RS may include transmission mode 9 and/or transmission mode 10 and/or other more advanced versions of transmission modes that use the DM-RS as a basic demodulation reference signal.

Optionally, the relevant information of the scheduled UE may include one or more of: a DM-RS antenna port used by an enhanced Physical Downlink Control Channel (ePDCCH) to schedule the UE, a subframe type of subframes occupied by the UE, a subframe index of the subframes occupied by the UE, a cell ID of a cell where the UE is located, an index to scheduled PDSCH physical resource blocks (PRBs) of the UE, a Cell Radio Network Temporary Identifier (C-RNTI) assigned to the UE, an ID of the UE (UE ID) and a UE-specific offset parameter.

Optionally, and the resource mapping approach of the PDSCH includes:

the PDSCH is mapped to one or more continuous PRBs of a same subframe;

or the PDSCH is mapped to a plurality of discrete PRBs, in two slots of a same subframe, the PRBs correspond to same frequency domain positions, and the PDSCH is based on a single antenna port transmission mode or a multi-antenna port transmission mode;

or the PDSCH is mapped to discrete PRB resources, in two slots of a same subframe, the PRBs correspond to same frequency domain positions, and assignment of the discrete PRB resources is limited to two clusters, i.e., two segments of Resource Blocks (RBs), with each cluster comprising one or more continuous Resource Block Groups (RBGs).

Optionally, the physical layer downlink control signaling may include DCI Format 1A, and newly added DCI Format 1E and/or DCI Format 1F.

Optionally, when the DCI Format 1A is used, the transmission parameters of the PDSCH may be optimized through a Localized/Distributed Virtual Resource Block (VRB) assignment indicator bit in the DCI Format 1A and/or an available Modulation and Coding Scheme (MCS) indicator bit.

Optionally, the transmission parameters of the PDSCH are optimized through a Localized/Distributed VRB assignment indicator bit in the DCI Format 1A and/or an available MCS indicator bit may include one or more of:

when the SCID and the value X are default values, the DM-RS antenna port is indicated dynamically through the Localized/Distributed VRB assignment indicator bit in the DCI Format 1A;

when the DM-RS antenna port is a default one, the SCID and the value X when the antenna port is initialized are indicated dynamically through the Localized/Distributed VRB assignment indicator bit in the DCI Format 1A;

when a transmission block carried by the PDSCH is a retransmission block, at least one of the DM-RS antenna port, the SCID and the value X are indicated dynamically through the Localized/Distributed VRB assignment indicator bit in the DCI Format 1A and/or the available MCS indicator bit, with the rest being default values;

two DM-RS antenna ports are indicated through the Localized/Distributed VRB assignment indicator bit in the DCI Format 1A, wherein both of sequential numbers of two indicated antenna ports are odd numbers or even numbers, or the two indicated antenna ports are ports having a fixed sequential number; or the resource mapping approach of the PDSCH is selected through the Localized/Distributed VRB assignment indicator bit in the DCI Format 1A.

Optionally, after the physical resource mapping of the PDSCH, selection of antenna parameters in assigned PRBs may include at least one of:

same antenna parameters are configured for the PRBs, wherein the same antenna parameters are selected from specified antenna parameters or determined in an implication way;

corresponding antenna parameters are configured independently for different PRBs, wherein the antenna parameters are selected from specified antenna parameters or determined in an implication way;

corresponding antenna parameters are configured independently for different clusters, with different PRBs in one cluster configured with same antenna parameters, wherein the antenna parameters are selected from specified antenna parameters or determined in an implication way; and wherein the antenna parameters comprise a DM-RS antenna port, and an SCID and a scrambling code initialized value X desired when a DM-RS port sequence is initialized.

Optionally, antenna parameters used by a PDSCH of the scheduled UE may be implicitly determined according to different types of subframes, the antenna parameters comprise a DM-RS antenna port, and an SCID and a scrambling code initialized value X desired when a DM-RS port sequence is initialized, and the different types of subframes comprise one or more of: a subframe corresponding to a case in which a newly added TDD special subframe configuration uses a normal cyclic prefix; a subframe corresponding to a case in which the newly added TDD special subframe configuration uses an extended cyclic prefix, a subframe corresponding to configurations other than the newly added TDD configuration, an MBSFN subframe or an ordinary subframe.

Optionally, the newly added TDD special subframe configuration may include:

a newly added TDD special subframe configuration is 9, i.e., (DwPTS:GP:UpPTS)=(6:6:2), when a DwPTS of the TDD special subframe uses a normal cyclic prefix;

or, a newly added TDD special subframe configuration is 7, i.e., (DwPTS:GP:UpPTS)=(5:5:2), when the DwPTS of the TDD special subframe uses an extended cyclic prefix.

Optionally, antenna parameters used by a PDSCH scheduled by the DCI Format 1A may be implicitly determined using antenna parameters corresponding to the ePDCCH when the UE is scheduled, the antenna parameters comprise a DM-RS antenna port, and an SCID and a scrambling code initialized value X desired when a DM-RS port sequence is initialized.

The technical solutions of the disclosure will be elaborated below based on specific embodiments.

It should be noted that embodiments of the disclosure are not only applicable to a PDSCH for new carriers, but also applicable to a CoMP PDSCH, and CoMP PDSCH transmission is also included in the scope of protection of the disclosure. Various correspondences (for example, correspondences between indexes after combinative encoding and specific antenna ports or SCIDs or X values) in the embodiments are not limited to what disclosed hereinafter. that is to say, their orders can be changed in any possible way as long as one-to-one correspondences are met, and the embodiment of the disclosure only gives one possible correspondence, 只 as long as states of specific attributions are consistent, i.e., included in the scope of protection of the disclosure.

Embodiment 1

A UE transmits data using a newly added carrier, and transmitted data correspond to a single transport block, as to single DM-RS antenna port transmission, an antenna port of a PDSCH corresponding to DCI Format 1A is determined implicitly through an antenna port of an ePDCCH that uses an X value and SCID value as same as those of a corresponding scheduled PDSCH. If the ePDCCH scheduling the UE is transmitted at an antenna port 9, it is considered by default that data of the UE are transmitted at a PDSCH on an antenna port 9, but herein the antenna port 9 is only taken as an example, if other antenna ports are used, the conclusion holds true as well. And the format of downlink control information is for example DCI Format 1A, however, newly added DCI Format 1E or DCI Format 1F is also applicable to the embodiment.

Embodiment 2

The UE transmits data using a newly added carrier, and transmitted data correspond to a single transport block, PDSCH resources used by the UE are scheduled through the DCI Format 1A, and a single antenna port transmitting the data of the UE is determined implicitly through a UE ID or C-RNTI; if there are two antenna ports for selection, an antenna port to be used by the UE is determined according to a constraint that (UE ID/C-RNTI) Mod 2 is equal to 0 or 1; if there are four antenna port for selection, the antenna port to be used by the UE is determined according to a constraint that (UE ID/C-RNTI) Mod 4 is equal to 1, 2, 3 or 4. And the format of downlink control information is for example DCI Format 1A, however, newly added DCI Format 1E or DCI Format 1F is also applicable to the embodiment.

Embodiment 3

The UE transmits data using a newly added carrier, and transmitted data correspond to a single transport block, PDSCH resources used by the UE are scheduled through the DCI Format 1A, and a single antenna port transmitting the data of the UE is determined implicitly through a subframe type. If a DwPTS of a TDD special subframe uses a normal CP, a newly added TDD special subframe configuration is (DwPTS:GP:UpPTS)=(6:6:2), then DM-RS antenna ports 7-10 are supported; or, when the DwPTS of the TDD special subframe uses an extended CP, the newly added TDD special subframe configuration is (DwPTS:GP:UpPTS)=(5:5:2), then a antenna port 5 is supported; if the subframe is an MBSFN subframe, a DM-RS antenna port 7 is supported; and if the subframe is an ordinary subframe, a single antenna port for example 7 is fixedly used, here the SCID takes by default 0 and the value X takes by default x(0). And the format of downlink control information is for example DCI Format 1A, however, newly added DCI Format 1E or DCI Format 1F is also applicable to the embodiment.

Embodiment 4

The UE transmits data using a newly added carrier, and transmitted data correspond to a single transport block, PDSCH resources used by the UE are scheduled through the DCI Format 1A, and a single antenna port transmitting the data of the UE is determined implicitly through a subframe index of a subframe occupied by the UE; when the index of the subframe occupied by the UE is m, if there are two antenna ports for selection, an antenna port to be used by the UE is determined according to a constraint that (m) Mod 2 is equal to 0 or 1; if there are four antenna port for selection, the antenna port to be used by the UE is determined according to a constraint that (m) Mod 4 is equal to 1, 2, 3 or 4. And the format of downlink control information is for example DCI Format 1A, however, newly added DCI Format 1E or DCI Format 1F is also applicable to the embodiment.

Embodiment 5

The UE transmits data using a newly added carrier, and transmitted data correspond to a single transport block, PDSCH resources used by the UE are scheduled through the DCI Format 1A, and a single antenna port transmitting the data of the UE is determined implicitly through a minimum index of PRBs of a scheduled PDSCH of the UE; when the minimum index of PRBs of the scheduled PDSCH of the UE is n, if there are two antenna ports for selection, an antenna port to be used by the UE is determined according to a constraint that (n) Mod 2 is equal to 0 or 1; if there are four antenna port for selection, the antenna port to be used by the UE is determined according to a constraint that (n) Mod 4 is equal to 1, 2, 3 or 4. And the format of downlink control information is for example DCI Format 1A, however, newly added DCI Format 1E or DCI Format 1F is also applicable to the embodiment.

Embodiment 6

The UE transmits data using a newly added carrier, transmitted data correspond to a single transport block, PDSCH resources used by the UE are scheduled through the DCI Format 1A, a minimum or maximum index of PRBs of a scheduled PDSCH of the UE is n, an index of a subframe occupied by the UE is m, the C-RNTI or the UE ID is k, and an offset parameter of a scheduled PRB of the UE is l; if there are two antenna ports for selection, a DM-RS antenna port to be used by the UE is determined according to a constraint that (m+n+k+l) Mod 2 is equal to 0 or 1; if there are four antenna port for selection, the DM-RS antenna port to be used by the UE is determined according to a constraint that (m+n+k−l) Mod 4 is equal to 1, 2, 3 or 4. And the format of downlink control information is for example DCI Format 1A, however, newly added DCI Format 1E or DCI Format 1F is also applicable to the embodiment.

Embodiment 6

The UE transmits data using a newly added carrier, transmitted data correspond to a single transport block, PDSCH resources used by the UE are scheduled through the DCI Format 1A, a minimum or maximum index of PRBs of a scheduled PDSCH of the UE is n, an index of a subframe occupied by the UE is m, the C-RNTI or the UE ID is k, and an offset parameter of a scheduled subframe of the UE is 1; if there are two antenna ports for selection, a DM-RS antenna port to be used by the UE is determined according to a constraint that (m+n+k+l) Mod 2 is equal to 0 or 1; if there are four antenna port for selection, the DM-RS antenna port to be used by the UE is determined according to a constraint that (m+n+k+l) Mod 4 is equal to 1, 2, 3 or 4. And the format of downlink control information is for example DCI Format 1A, however, newly added DCI Format 1E or DCI Format 1F is also applicable to the embodiment.

Embodiment 8

The UE transmits data using a newly added carrier, transmitted data correspond to a single transport block, PDSCH resources used by the UE are scheduled through the DCI Format 1A, a maximum or minimum index of PRBs of a scheduled PDSCH of the UE is n, an index of a subframe occupied by the UE is m, the C-RNTI or the UE ID is k, and an offset parameter of a scheduled PRB of the UE is 1; if there are two antenna ports for selection, a DM-RS antenna port to be used by the UE is determined according to a constraint that (n+k−l) Mod 2 is equal to 0 or 1; if there are four antenna port for selection, the DM-RS antenna port to be used by the UE is determined according to a constraint that (n+k+l) Mod 4 is equal to 1, 2, 3 or 4. And the format of downlink control information is for example DCI Format 1A, however, newly added DCI Format 1E or DCI Format 1F is also applicable to the embodiment.

Embodiment 9

The UE transmits data using a newly added carrier, transmitted data correspond to a single transport block, PDSCH resources used by the UE are scheduled through the DCI Format 1A, a minimum or maximum index of PRBs of a scheduled PDSCH of the UE is n, an index of a subframe occupied by the UE is m, the C-RNTI or the UE ID is k, and an offset parameter of a scheduled subframe of the UE is 1; if there are two antenna ports for selection, a DM-RS antenna port to be used by the UE is determined according to a constraint that (n+k+l) Mod 2 is equal to 0 or 1; if there are four antenna port for selection, the DM-RS antenna port to be used by the UE is determined according to a constraint that (n+k+l) Mod 4 is equal to 1, 2, 3 or 4. And the format of downlink control information is for example DCI Format 1A, however, newly added DCI Format 1E or DCI Format 1F is also applicable to the embodiment.

Embodiment 10

The UE transmits data using a newly added carrier, transmitted data correspond to a single transport block, PDSCH resources used by the UE are scheduled through the DCI Format 1A, a maximum or minimum index of PRBs of a scheduled PDSCH of the UE is n, an index of a subframe occupied by the UE is m, the C-RNTI or the UE ID is k, and an offset parameter of a scheduled PRB of the UE is 1; if there are two antenna ports for selection, a DM-RS antenna port to be used by the UE is determined according to a constraint that (n+m+l) Mod 2 is equal to 0 or 1; if there are four antenna port for selection, the DM-RS antenna port to be used by the UE is determined according to a constraint that (m+n+l) Mod 4 is equal to 1, 2, 3 or 4. And the format of downlink control information is for example DCI Format 1A, however, newly added DCI Format 1E or DCI Format 1F is also applicable to the embodiment.

Embodiment 11

The UE transmits data using a newly added carrier, transmitted data correspond to a single transport block, PDSCH resources used by the UE are scheduled through the DCI Format 1A, a minimum or maximum index of PRBs of a scheduled PDSCH of the UE is n, an index of a subframe occupied by the UE is m, the C-RNTI or the UE ID is k, and an offset parameter of a scheduled subframe of the UE is 1; if there are two antenna ports for selection, a DM-RS antenna port to be used by the UE is determined according to a constraint that (n+m+l) Mod 2 is equal to 0 or 1; if there are four antenna port for selection, the DM-RS antenna port to be used by the UE is determined according to a constraint that (m+n+l) Mod 4 is equal to 1, 2, 3 or 4. And the format of downlink control information is for example DCI Format 1A, however, newly added DCI Format 1E or DCI Format 1F is also applicable to the embodiment.

Embodiment 12

The UE transmits data using a newly added carrier, transmitted data correspond to a single transport block, PDSCH resources used by the UE are scheduled through the DCI Format 1A, a maximum or minimum index of PRBs of a scheduled PDSCH of the UE is n, an index of a subframe occupied by the UE is m, the C-RNTI or the UE ID is k, and an offset parameter of a scheduled PRB of the UE is 1; if there are two antenna ports for selection, a DM-RS antenna port to be used by the UE is determined according to a constraint that (n+l) Mod 2 is equal to 0 or 1; if there are four antenna port for selection, the DM-RS antenna port to be used by the UE is determined according to a constraint that (n+l) Mod 4 is equal to 1, 2, 3 or 4. And the format of downlink control information is for example DCI Format 1A, however, newly added DCI Format 1E or DCI Format 1F is also applicable to the embodiment.

Embodiment 13

The UE transmits data using a newly added carrier, transmitted data correspond to a single transport block, PDSCH resources used by the UE are scheduled through the DCI Format 1A, a maximum or minimum index of PRBs of a scheduled PDSCH of the UE is n, an index of a subframe occupied by the UE is m, the C-RNTI or the UE ID is k, and an offset parameter of a scheduled subframe of the UE is 1; if there are two antenna ports for selection, a DM-RS antenna port to be used by the UE is determined according to a constraint that (n+l) Mod 2 is equal to 0 or 1; if there are four antenna port for selection, the DM-RS antenna port to be used by the UE is determined according to a constraint that (n+l) Mod 4 is equal to 1, 2, 3 or 4. And the format of downlink control information is for example DCI Format 1A, however, newly added DCI Format 1E or DCI Format 1F is also applicable to the embodiment.

Embodiment 14

The UE transmits data using a newly added carrier, transmitted data correspond to a single transport block, PDSCH resources used by the UE are scheduled through the DCI Format 1A, a maximum or minimum index of PRBs of a scheduled PDSCH of the UE is n, an index of a subframe occupied by the UE is m, the C-RNTI or the UE ID is k, and an offset parameter of a scheduled PRB of the UE is 1; if there are two antenna ports for selection, a DM-RS antenna port to be used by the UE is determined according to a constraint that (n+m) Mod 2 is equal to 0 or 1; if there are four antenna port for selection, the DM-RS antenna port to be used by the UE is determined according to a constraint that (n+m) Mod 4 is equal to 1, 2, 3 or 4. And the format of downlink control information is for example DCI Format 1A, however, newly added DCI Format 1E or DCI Format 1F is also applicable to the embodiment.

Embodiment 15

The UE transmits data using a newly added carrier, transmitted data correspond to a single transport block, PDSCH resources used by the UE are scheduled through the DCI Format 1A, a maximum or minimum index of PRBs of a scheduled PDSCH of the UE is n, an index of a subframe occupied by the UE is m, the C-RNTI or the UE ID is k, and an offset parameter of a scheduled subframe of the UE is 1; if there are two antenna ports for selection, a DM-RS antenna port to be used by the UE is determined according to a constraint that (n+l) Mod 2 is equal to 0 or 1; if there are four antenna port for selection, the DM-RS antenna port to be used by the UE is determined according to a constraint that (m+l) Mod 4 is equal to 1, 2, 3 or 4. And the format of downlink control information is for example DCI Format 1A, however, newly added DCI Format 1E or DCI Format 1F is also applicable to the embodiment.

Embodiment 16

Figure 3:
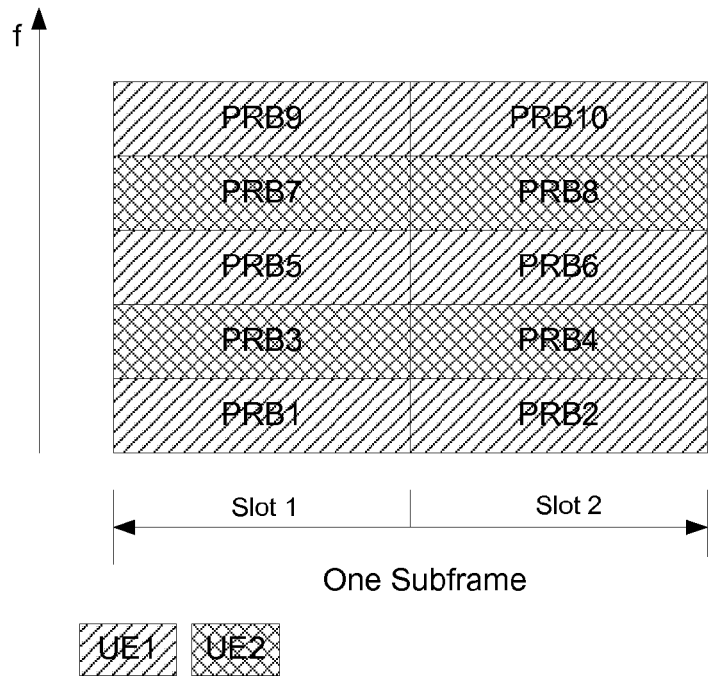
FIG. 3 is a schematic diagram showing a physical downlink shared channel being mapped to multiple discrete Physical Resource Blocks (PRBs)

The UE transmits data using a newly added carrier, transmitted data correspond to a single transport block, PDSCH resources used by the UE are scheduled by the DCI Format 1A, the UE transmits data using a single DM-RS antenna port, a scheduled PDSCH of the UE consists of discrete PRBs in frequency domain; different from an existing resource assignment approach of DVRBs, when the PDSCH consists of discrete PRBs, in two slots of a same subframe, the PRBs correspond to same frequency domain positions, as shown in FIG. 3. And the format of downlink control information is for example DCI Format 1A, however, newly added DCI Format 1E or DCI Format 1F is also applicable to the embodiment.

Embodiment 17

The UE transmits data using a newly added carrier, transmitted data correspond to a single transport block, the UE transmits data using a fixed single DM-RS antenna port, if the data of UE is transmitted at a PDSCH on an antenna port 7, PDSCH resources used by the UE are scheduled through the DCI Format 1A, the value X takes by default x(0), and the SCID is selected dynamically through an L/DVRB bit field in the DCI Format 1A.

| L/DVRB bit field | 0 | 1 |
| --- | --- | --- |
| SCID | 0 | 1 | or

| L/DVRB bit field | 0 | 1 |
| --- | --- | --- |
| SCID | 1 | 0 |

Herein an antenna port 7 is taken as an example, if other antenna ports are used, values can be obtained by analogy, and the value X can take by default x(1), the value of X and the value of SCID can also be correlated with each other:

| SCID | 0 | 1 |
| --- | --- | --- |
| X | X(0) | X(1) | or

| SCID | 0 | 1 |
| --- | --- | --- |
| X | X(1) | X(0) |

If fixed two antenna ports are used to transmit data, optional combination of two antenna ports can be {7, 8}, {7,9}, {7,10}, {8,9}, {8,10} or {9,10}, the SCID is selected dynamically through an L/DVRB bit field in the DCI Format 1A, and for the relation between the value of X and the value of SCID, the case in which a fixed single DM-RS antenna port is used can be referred to. And the format of downlink control information is for example DCI Format 1A, however, newly added DCI Format 1E or DCI Format 1F is also applicable to the embodiment.

Embodiment 18

The UE transmits data using a newly added carrier, transmitted data correspond to a single transport block, the UE transmits data using a fixed single DM-RS antenna port, if the data of UE is transmitted at a PDSCH on an antenna port 7, PDSCH resources used by the UE are scheduled through the DCI Format 1A, the SCID takes by default 0, and the value X is selected dynamically through an L/DVRB bit field in the DCI Format 1A.

| L/DVRB bit field | 0 | 1 |
| --- | --- | --- |
| X | X(0) | X(1) | or

| L/DVRB bit field | 0 | 1 |
| --- | --- | --- |
| X | X(1) | X(0) |

Herein an antenna port 7 is taken as an example, if other antenna ports are used, values can be obtained by analogy, and the SCID can take by default 1, the value of X and the value of SCID can also be correlated with each other:

| X | X(0) | X(1) |
| --- | --- | --- |
| SCID | 0 | 1 | or

| X | X(0) | X(1) |
| --- | --- | --- |
| SCID | 1 | 0 |

If fixed two antenna ports are used to transmit data, optional combination of two antenna ports can be {7, 8}, {7,9}, {7,10}, {8,9}, {8,10} or {9,10}, the SCID is selected dynamically through an L/DVRB bit field in the DCI Format 1A; for the relation between the value of X and the value of SCID, the case in which a fixed single DM-RS antenna port is used can be referred to, and the format of downlink control information is for example the DCI Format 1A, and newly added DCI Format 1E or DCI Format 1F is also applicable to the embodiment.

Embodiment 19

The UE transmits data using a newly added carrier, transmitted data correspond to a single transport block, PDSCH resources used by the UE are scheduled through the DCI Format 1A; if SCID takes by default 0, X takes by default x(0), a single antenna port is used to transmit data, and the antenna port is selected dynamically from {TP7, TP8} through an L/DVRB bit in the DCI 1A.

| Bit indicator corresponding to L/DVRB bit field | Antenna port |
|---|---|
| 0 | 7 |
| 1 | 8 | or

| Bit indicator corresponding to L/DVRB bit field | Antenna port |
|---|---|
| 0 | 8 |
| 1 | 7 |

Herein antenna ports {7,8} are taken as an example, one antenna port can be selected from {7, 9}, {7,10}, {8,9}, {8,10} or {9,10} as PDSCH transmission of the UE through an L/DVRB bit field indicator in the DCI 1A; the SCID can take also by default 1, the value X can also take by default x(1), and the format of downlink control information is for example the DCI Format 1A, newly added DCI Format 1E or DCI Format 1F is also applicable to the embodiment.

Embodiment 20

The UE transmits data using a newly added carrier, transmitted data correspond to a single transport block, PDSCH resources used by the UE are scheduled through the DCI Format 1A, a single antenna port is used to transmit data; if SCID takes by default 0, X takes by default x(0), the single antenna port is selected dynamically from {7,8,9,10} through an L/DVRB bit field and a newly added bit in the DCI 1A.

| L/DVRB bit field + newly added bit | Antenna port |
|---|---|
| 00 | 7 |
| 01 | 8 |
| 10 | 9 |
| 11 | 10 |

The above table shows correspondences between bit fields and antenna ports, other correspondences are also included in the embodiment, and the SCID can also take by default 1, and the value X can take by default x(1). And the format of downlink control information is for example DCI Format 1A, however, newly added DCI Format 1E or DCI Format 1F is also applicable to the embodiment.

Embodiment 21

The UE transmits data using a newly added carrier, transmitted data correspond to a single transport block, when downlink data of the UE are desired to be retransmitted, PDSCH resources used by the retransmission are scheduled through the DCI Format 1A, a single antenna port is used to transmit data; if SCID takes by default 0, X takes by default x(0), the single antenna port is selected dynamically from {7,8,9,10} through an L/DVRB bit field in the DCI Format 1A and a reversed bit in an MCS indicator field.

| L/DVRB bit field + MCS reserved bit | Antenna port |
|---|---|
| 00 | 7 |
| 01 | 8 |
| 10 | 9 |
| 11 | 10 |

The above table shows correspondences between bit fields and antenna ports, other correspondences are also included in the embodiment, and the SCID can also take by default 1, and the value X can take by default x(1). And the format of downlink control information is for example DCI Format 1A, however, newly added DCI Format 1E or DCI Format 1F is also applicable to the embodiment.

Embodiment 22

The UE transmits data using a newly added carrier, transmitted data correspond to a single transport block, PDSCH resources used by the UE are scheduled through the DCI Format 1A, a single antenna port is used to transmit data, the antenna port, value of the SCID and value of X are indicated dynamically through 4 bits including the L/DVRB bit field and newly added 3 bits in the DCI Format 1A.

| L/DVRB bit field + newly added 3 bits | Antenna port | SCID | X |
|---|---|---|---|
| 0000 | 7 | 0 | X(0) |
| 0001 | 7 | 0 | X(1) |
| 0010 | 7 | 1 | X(0) |
| 0011 | 7 | 1 | X(1) |
| 0100 | 8 | 0 | X(0) |
| 0101 | 8 | 0 | X(1) |
| 0110 | 8 | 1 | X(0) |
| 0111 | 8 | 1 | X(1) |
| 1000 | 9 | 0 | X(0) |
| 1001 | 9 | 0 | X(1) |
| 1010 | 9 | 1 | X(0) |
| 1011 | 9 | 1 | X(1) |
| 1100 | 10 | 0 | X(0) |
| 1101 | 10 | 0 | X(1) |
| 1110 | 10 | 1 | X(0) |
| 1111 | 10 | 1 | X(1) |

The above table shows correspondences between bit fields, antenna ports, SCID and X, other correspondences are also included in the embodiment. And the format of downlink control information is for example DCI Format 1A, however, newly added DCI Format 1E or DCI Format 1F is also applicable to the embodiment.

Embodiment 23

The UE transmits data using a newly added carrier, transmitted data correspond to a single transport block, downlink data of the UE are desired to be retransmitted, PDSCH resources used by the retransmission are scheduled through the DCI Format 1A, a single antenna port is used to transmit data, the antenna port, value of the SCID and value of X are indicated dynamically through 4 bits including the L/DVRB bit field in the DCI Format 1A and bits reserved in the MCS indicator field.

| L/DVRB bit field + MCS reserved bit | Antenna port | SCID | X |
|---|---|---|---|
| 0000 | 7 | 0 | X(0) |
| 0001 | 7 | 0 | X(1) |
| 0010 | 7 | 1 | X(0) |

-continued

| L/DVRB bit field + MCS reserved bit | Antenna port | SCID | X |
|---|---|---|---|
| 0011 | 7 | 1 | X(1) |
| 0100 | 8 | 0 | X(0) |
| 0101 | 8 | 0 | X(1) |
| 0110 | 8 | 1 | X(0) |
| 0111 | 8 | 1 | X(1) |
| 1000 | 9 | 0 | X(0) |
| 1001 | 9 | 0 | X(1) |
| 1010 | 9 | 1 | X(0) |
| 1011 | 9 | 1 | X(1) |
| 1100 | 10 | 0 | X(0) |
| 1101 | 10 | 0 | X(1) |
| 1110 | 10 | 1 | X(0) |
| 1111 | 10 | 1 | X(1) |

The above table shows correspondences between bit fields and antenna ports, other correspondences are also included in the embodiment, And the format of downlink control information is for example DCI Format 1A, however, newly added DCI Format 1E or DCI Format 1F is also applicable to the embodiment.

Embodiment 24

The UE transmits data using a newly added carrier, transmitted data correspond to a single transport block, PDSCH resources used by the UE are scheduled through the DCI Format 1A, X takes by default x(0), the SCID takes by default 0, data are transmitted through two antenna ports, and all antenna ports with odd sequential numbers or all antenna ports with even sequential numbers are selected dynamically from {TP7, TP8, TP9, TP10} through an L/DVRB bit in the DCI Format 1A.

| Bit indicator corresponding to L/DVRB bit field | Antenna port |
|---|---|
| 0 | All antenna ports with odd sequential numbers |
| 1 | All antenna ports with even sequential numbers | or

| Bit indicator corresponding to L/DVRB bit field | Antenna port |
|---|---|
| 0 | All antenna ports with even sequential numbers |
| 1 | All antenna ports with odd sequential numbers |

Herein the SCID can also take by default 1, and X can also take by default x(1). And the format of downlink control information is for example DCI Format 1A, however, newly added DCI Format 1E or DCI Format 1F is also applicable to the embodiment.

Embodiment 25

The UE transmits data using a newly added carrier, transmitted data correspond to a single transport block, PDSCH resources used by the UE are scheduled through the DCI Format 1A, fixed four antenna ports {7,8,9,10} are used to transmit data, and values of the SCID and X are indicated dynamically through an L/DVRB bit and a newly added bit in the DCI Format 1A.

| L/DVRB bit field + newly added bit | SCID | X |
|---|---|---|
| 00 | 0 | X(0) |
| 01 | 0 | X(1) |
| 10 | 1 | X(0) |
| 11 | 1 | X(1) |

The above table shows correspondences between bit fields, SCID and X, other correspondences are also included in the embodiment. And the format of downlink control information is for example DCI Format 1A, however, newly added DCI Format 1E or DCI Format 1F is also applicable to the embodiment.

Embodiment 26

The UE transmits data using a newly added carrier, transmitted data correspond to a single transport block, PDSCH resources used by the UE are scheduled through the DCI Format 1A, fixed four antenna ports {7,8,9,10} are used to transmit data, and values of the SCID and X are indicated dynamically through an L/DVRB bit in the DCI Format 1A and an MCS reserved bit.

| L/DVRB bit field + MCS reserved bit | SCID | X |
|---|---|---|
| 00 | 0 | X(0) |
| 01 | 0 | X(1) |
| 10 | 1 | X(0) |
| 11 | 1 | X(1) |

The above table shows correspondences between bit fields, SCID and X, other correspondences are also included in the embodiment. And the format of downlink control information is for example DCI Format 1A, however, newly added DCI Format 1E or DCI Format 1F is also applicable to the embodiment.

Embodiment 27

The UE transmits data using a newly added carrier, transmitted data correspond to a single transport block, PDSCH resources used by the UE are scheduled through the DCI Format 1A, the base station configures, through higher layer RRC signaling, DM-RS antenna ports and SCID values when the UE performs PDSCH transmission, for example, the higher layer configures the UE to use a DM_RS antenna port 7 to perform PDSCH transmission, with SCID taking 1 and the value of X being correlated with that of the SCID; at the reception end, the UE demodulates the PDSCH according to the antenna ports, SCID and X values notified by the base station. Herein a DM-RS antenna port 7 is taken as an example, other DM-RS antenna ports are also included in the embodiment, and here the base station may configure, through RRC signaling, multiple DM-RS antenna ports to perform PDSCH transmission. And the format of downlink control information is for example DCI Format 1A, however, newly added DCI Format 1E or DCI Format 1F is also applicable to the embodiment.

Embodiment 28

Figure 4:
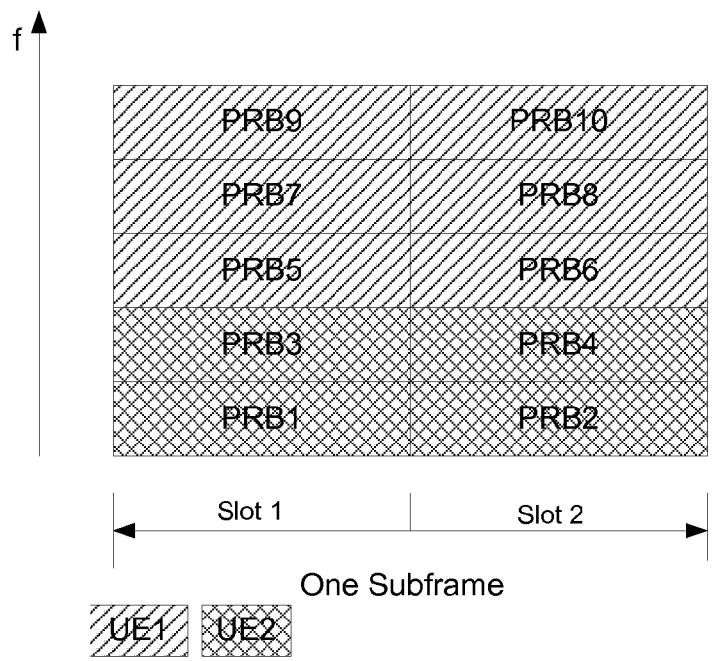
FIG. 4 is a schematic diagram showing a physical downlink shared channel being mapped to continuous PRBs.

The UE transmits data using a newly added carrier, transmitted data correspond to a single transport block, PDSCH resources used by the UE are scheduled through the DCI Format 1A, the resource assignment approach of the PDSCH is selected through an L/DVRB bit in the DCI Format 1A, wherein a possible resource assignment approach of the PDSCH includes: the PDSCH is mapped to one or more continuous PRBs of a same subframe, as shown in FIG. 4; or the PDSCH is mapped to multiple discrete PRBs, in two slots of a same subframe, the PRBs correspond to same frequency domain positions, and the PDSCH is based on a single antenna port transmission mode or a multi-antenna port transmission mode, as shown in FIG. 3.

Based on the resource assignment approaches in FIG. 3 and FIG. 4, solutions for the selection of antenna parameters in corresponding PRBs include:

same antenna parameters are configured for the PRBs, wherein the same antenna parameters are selected from specified antenna parameters or determined in an implication way;

corresponding antenna parameters are configured independently for different PRBs, wherein the antenna parameters are selected from specified antenna parameters or determined in an implication way;

corresponding antenna parameters are configured independently for different clusters, with different PRBs in one cluster configured with same antenna parameters, wherein the antenna parameters are selected from specified antenna parameters or determined in an implication way; and wherein the antenna parameters comprise a DM-RS antenna port, and an SCID and a scrambling code initialized value X desired when a DM-RS port sequence is initialized.

And the format of downlink control information is for example DCI Format 1A, however, newly added DCI Format 1E or DCI Format 1F is also applicable to the embodiment.

Embodiment 29

Figure 5:
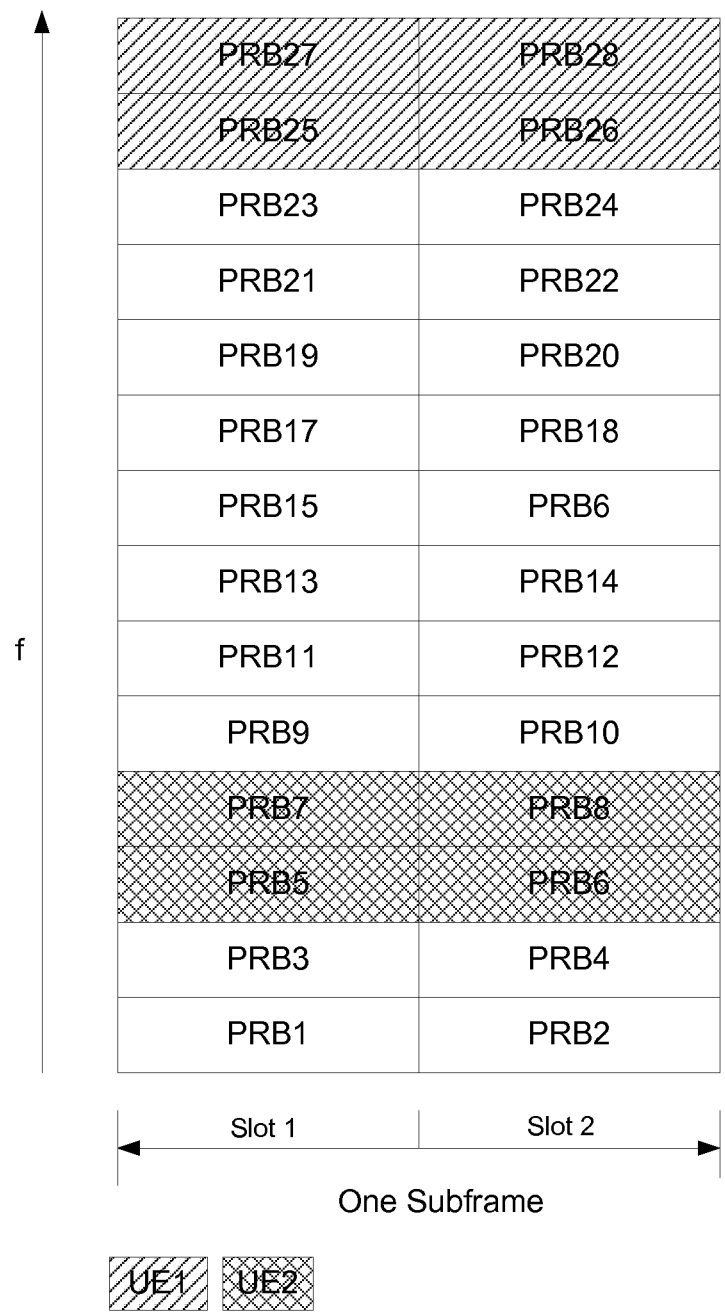
FIG. 5 is a schematic diagram showing a physical downlink shared channel being mapped to discrete PRBs.

The UE transmits data using a newly added carrier, transmitted data correspond to a single transport block, PDSCH resources used by the UE are scheduled through the DCI Format 1A, the resource assignment approach of the PDSCH is selected through an L/DVRB bit in the DCI Format 1A, wherein a possible resource assignment approach of the PDSCH includes: the PDSCH is mapped to one or more continuous PRBs of a same subframe, as shown in FIG. 4; or the PDSCH is mapped to multiple discrete PRBs, in two slots of a same subframe, the PRBs correspond to same frequency domain positions, and assignment of the discrete PRB resources is limited to two clusters, i.e., two segments of Resource Blocks (RBs), with each cluster comprising one or more continuous RBGs, as shown in FIG. 5, assigned discrete PRB resources can be indicated through respective indication of a starting RBG and an ending RBG for the assigned two clusters, with each PRG including P RBs, wherein the value of P is a function of downlink system bandwidth $N_{RB}^{DL}$.

| Downlink system bandwidth $N_{RB}^{DL}$ | RBG Size(P) |
|---|---|
| 10≤10 | 1 |
| 11-26 | 2 |
| 27-63 | 3 |
| 64-110 | 4 |

Based on the resource assignment approaches in FIG. 3 and FIG. 4, solutions for the selection of antenna parameters in corresponding PRBs include:

same antenna parameters are configured for the PRBs, wherein the same antenna parameters are selected from specified antenna parameters or determined in an implication way;

corresponding antenna parameters are configured independently for different PRBs, wherein the antenna parameters are selected from specified antenna parameters or determined in an implication way;

corresponding antenna parameters are configured independently for different clusters, with different PRBs in one cluster configured with same antenna parameters, wherein the antenna parameters are selected from specified antenna parameters or determined in an implication way; and wherein the antenna parameters comprise a DM-RS antenna port, and an SCID and a scrambling code initialized value X desired when a DM-RS port sequence is initialized.

And the format of downlink control information is for example DCI Format 1A, however, newly added DCI Format 1E or DCI Format 1F is also applicable to the embodiment.

What described above are merely preferred embodiments of the disclosure, and are not intended to limit the scope of protection of the disclosure, relations between states and signaling bit values in above embodiments can be replaced in any ways, as long as descriptions with respect to same states are within the scope of the disclosure.

The invention claimed is:

1. A physical downlink shared channel transmission method, comprising:

determining, by a network side, transmission parameters of a Physical Downlink Shared Channel (PDSCH), according to a relevant transmission mode of a DM-RS and relevant information of a scheduled UE or according to the relevant information of the scheduled UE, wherein the transmission parameters include one or more of: a resource mapping approach of the PDSCH, a downlink DM-RS antenna port in use, and a Scrambling Code Identity (SCID) and a scrambling code initialized value X desired when a downlink DM-RS port sequence is initialized; wherein the scrambling initialized value X takes an integer between 0 and 503; and transmitting data, by the network side, according to the determined transmission parameters of the PDSCH;

wherein the relevant information of the scheduled UE comprises one or more of: a DM-RS antenna port used by an enhanced Physical Downlink Control Channel (ePDCCH) to schedule the UE, a subframe type of subframes occupied by the UE, a subframe index of the subframes occupied by the UE, a cell ID of a cell where the UE is located, an index to scheduled PDSCH physical resource blocks (PRBs) of the UE, a Cell Radio Network Temporary Identifier (C-RNTI) assigned to the UE, an ID of the UE (UE ID) and a UE-specific offset parameter;

wherein antenna parameters used by a PDSCH of the scheduled UE are implicitly determined using different types of subframes, the antenna parameters comprise a DM-RS antenna port, an SCID or a scrambling code initialized value X desired when a DM-RS port sequence is initialized, and the different types of subframes comprise one or more of: a subframe corresponding to a case in which a newly added TDD special subframe configuration uses a normal cyclic prefix; a subframe corresponding to a case in which the newly added TDD special subframe configuration uses an extended cyclic prefix, a subframe corresponding to configurations other than the newly added TDD special subframe configuration, an MBSFN subframe or an ordinary subframe;

or, wherein antenna parameters used by a PDSCH scheduled by DCI Format 1A are implicitly determined using antenna parameters corresponding to the ePDCCH when the UE is scheduled, the antenna parameters comprise a DM-RS antenna port, an SCID or a scrambling code initialized value X desired when a DM-RS port sequence is initialized.

2. The method according to claim 1, further comprising: notifying, by the network side, a terminal of the transmission parameters of the PDSCH, and/or determining, by the terminal, the transmission parameters of the PDSCH according to the relevant information of the scheduled UE;
receiving, by the terminal, data according to the transmission parameters of the PDSCH notified by the network side and/or the transmission parameters of the PDSCH determined according to the relevant information of the scheduled UE; and
wherein the step of notifying, by the network side, a terminal of the transmission parameters of the PDSCH comprises: notifying the terminal of the transmission parameters of the PDSCH through physical layer downlink control signaling information and/or higher layer signaling information.

3. The method according to claim 2, wherein the physical layer downlink control signaling comprises DCI Format 1A, and newly added DCI Format 1E and/or DCI Format 1F.

4. The method according to claim 3, wherein when the DCI Format 1A is used, optimizing the transmission parameters of the PDSCH through a Localized/Distributed Virtual Resource Block (VRB) assignment indicator bit in the DCI Format 1A and/or an available Modulation and Coding Scheme (MCS) indicator bit.

5. The method according to claim 4, wherein the step of optimizing the transmission parameters of the PDSCH through a Localized/Distributed VRB assignment indicator bit in the DCI Format 1A and/or an available MCS indicator bit comprises one or more of:
when the SCID and the value X are default values, indicating dynamically the DM-RS antenna port through the Localized/Distributed VRB assignment indicator bit in the DCI Format 1A;
when the DM-RS antenna port is a default one, indicating dynamically the SCID and the value X when the antenna port is initialized, through the Localized/Distributed VRB assignment indicator bit in the DCI Format 1A;
when a transmission block carried by the PDSCH is a retransmission block, indicating dynamically at least one of the DM-RS antenna port, the SCID and the value X through the Localized/Distributed VRB assignment indicator bit in the DCI Format 1A and/or the available MCS indicator bit, with the rest being default values;
indicating two DM-RS antenna ports through the Localized/Distributed VRB assignment indicator bit in the DCI Format 1A, wherein both of sequential numbers of two indicated antenna ports are odd numbers or even numbers, or the two indicated antenna ports are ports having a fixed sequential number; or
selecting the resource mapping approach of the PDSCH through the Localized/Distributed VRB assignment indicator bit in the DCI Format 1A.

6. The method according to claim 1, wherein the relevant transmission mode of the DM-RS comprises transmission mode 9 and/or transmission mode 10 and/or other more advanced versions of transmission modes that use the DM-RS as a basic demodulation reference signal.

7. The method according to claim 1, wherein the step of determining a resource mapping approach of the PDSCH comprises: determining the the resource mapping approach of the PDSCH according to channel state information (CSI), and
the resource mapping approach of the PDSCH comprises:
mapping the PDSCH to one or more continuous PRBs of a same subframe;
or mapping the PDSCH to a plurality of discrete PRBs, and in two slots of a same subframe, the PRBs correspond to same frequency domain positions, and the PDSCH is based on a single antenna port transmission mode or a multi-antenna port transmission mode;
or mapping the PDSCH to discrete PRB resources, and in two slots of a same subframe, the PRBs correspond to same frequency domain positions, and assignment of the discrete PRB resources is limited to two clusters, i.e., two segments of Resource Blocks (RBs), with each cluster comprising one or more continuous Resource Block Groups (RBGs).

8. The method according to claim 1, wherein after the physical resource mapping of the PDSCH, selection of antenna parameters in assigned PRBs comprises at least one of:
configuring same antenna parameters for the PRBs, wherein the same antenna parameters are selected from specified antenna parameters or determined in an implication way;
configuring independently corresponding antenna parameters for different PRBs, wherein the antenna parameters are selected from specified antenna parameters or determined in an implication way;
configuring independently corresponding antenna parameters for different clusters, with different PRBs in one cluster configured with same antenna parameters, wherein the antenna parameters are selected from specified antenna parameters or determined in an implication way,
the antenna parameters comprise a DM-RS antenna port, and an SCID and a scrambling code initialized value X desired when a DM-RS port sequence is initialized.

9. The method according to claim 1, wherein the newly added TDD special subframe configuration comprises:
when a DwPTS of the TDD special subframe uses a normal cyclic prefix, the newly added TDD special subframe configuration is 9, i.e., (DwPTS:GP:UpPTS)=(6:6:2);
when the DwPTS of the TDD special subframe uses an extended cyclic prefix, the newly added TDD special subframe configuration is 7, i.e., (DwPTS:GP:UpPTS)=(5:5:2).

10. A physical downlink shared channel transmission system, comprising a network equipment,
wherein the network equipment is configured to determine transmission parameters of a Physical Downlink Shared Channel (PDSCH) according to a relevant transmission mode of a DM-RS and relevant information of a scheduled UE or according to the relevant information of the scheduled UE, and transmit data according the determined transmission parameters of the PDSCH, wherein the transmission parameters include one or more of: a resource mapping approach of the PDSCH, a downlink DM-RS antenna port in use, and a Scrambling Code Identity (SCID) and a scrambling code initialized value X desired when a downlink DM-RS port sequence is initialized, wherein the scrambling initialized value X takes an integer between 0 and 503;

wherein the relevant information of the scheduled UE comprises one or more of: a DM-RS antenna port used by an enhanced Physical Downlink Control Channel (ePDCCH) to schedule the UE, a subframe type of subframes occupied by the UE, a subframe index of the subframes occupied by the UE, a cell ID of a cell where the UE is located, an index to scheduled PDSCH physical resource blocks (PRBs) of the UE, a Cell Radio Network Temporary Identifier (C-RNTI) assigned to the UE, an ID of the UE (UE ID) and a UE-specific offset parameter;

wherein antenna parameters used by a PDSCH of the scheduled UE are implicitly determined according to different types of subframes, the antenna parameters comprise a DM-RS antenna port, an SCID or a scrambling code initialized value X desired when a DM-RS port sequence is initialized, and the different types of subframes comprise one or more of: a subframe corresponding to a case in which a newly added TDD special subframe configuration uses a normal cyclic prefix; a subframe corresponding to a case in which the newly added TDD special subframe configuration uses an extended cyclic prefix, a subframe corresponding to configurations other than the newly added TDD configuration, an MBSFN subframe or an ordinary subframe;

or, wherein antenna parameters used by a PDSCH scheduled by DCI Format 1A are implicitly determined using antenna parameters corresponding to the ePDCCH when the UE is scheduled, the antenna parameters comprise a DM-RS antenna port, an SCID or a scrambling code initialized value X desired when a DM-RS port sequence is initialized.

11. The system according to claim 10, further comprising a terminal,
wherein the network equipment is further configured to notify the terminal of the transmission parameters of the PDSCH;
the terminal is configured to receive data according to the transmission parameters of the PDSCH notified by the network equipment and/or the transmission parameters of the PDSCH determined according to the relevant information of the scheduled UE; and
wherein the network side notifying the terminal of the transmission parameters of the PDSCH comprises: the terminal is notified of the transmission parameters of the PDSCH through physical layer downlink control signaling information and/or higher layer signaling information.

12. The system according to claim 11, wherein the physical layer downlink control signaling comprises DCI Format 1A, and newly added DCI Format 1E and/or DCI Format 1F.

13. The system according to claim 12, wherein when the DCI Format 1A is used, the transmission parameters of the PDSCH are optimized through a Localized/Distributed Virtual Resource Block (VRB) assignment indicator bit in the DCI Format 1A and/or an available Modulation and Coding Scheme (MCS) indicator bit.

14. The system according to claim 13, wherein the transmission parameters of the PDSCH are optimized through a Localized/Distributed VRB assignment indicator bit in the DCI Format 1A and/or an available MCS indicator bit comprises one or more of:
when the SCID and the value X are default values, the DM-RS antenna port is indicated dynamically through the Localized/Distributed VRB assignment indicator bit in the DCI Format 1A;

when the DM-RS antenna port is a default one, the SCID and the value X when the antenna port is initialized are indicated dynamically through the Localized/Distributed VRB assignment indicator bit in the DCI Format 1A;

when a transmission block carried by the PDSCH is a retransmission block, at least one of the DM-RS antenna port, the SCID and the value X are indicated dynamically through the Localized/Distributed VRB assignment indicator bit in the DCI Format 1A and/or the available MCS indicator bit, with the rest being default values;

two DM-RS antenna ports are indicated through the Localized/Distributed VRB assignment indicator bit in the DCI Format 1A, wherein both of sequential numbers of two indicated antenna ports are odd numbers or even numbers, or the two indicated antenna ports are ports having a fixed sequential number; or the resource mapping approach of the PDSCH is selected through the Localized/Distributed VRB assignment indicator bit in the DCI Format 1A.

15. The system according to claim 10, wherein the relevant transmission mode of the DM-RS comprises transmission mode 9 and/or transmission mode 10 and/or other more advanced versions of transmission modes that use the DM-RS as a basic demodulation reference signal.

16. The method according to claim 10, wherein the resource mapping approach of the PDSCH comprises:
the PDSCH is mapped to one or more continuous PRBs of a same subframe;
or the PDSCH is mapped to a plurality of discrete PRBs, and in two slots of a same subframe, the PRBs correspond to same frequency domain positions, and the PDSCH is based on a single antenna port transmission mode or a multi-antenna port transmission mode;
or the PDSCH is mapped to discrete PRB resources, and in two slots of a same subframe, the PRBs correspond to same frequency domain positions, and assignment of the discrete PRB resources is limited to two clusters, i.e., two segments of Resource Blocks (RBs), with each cluster comprising one or more continuous Resource Block Groups (RBGs).

17. The system according to claim 10, wherein after the physical resource mapping of the PDSCH, selection of antenna parameters in assigned PRBs comprises at least one of:
same antenna parameters are configured for the PRBs, wherein the same antenna parameters are selected from specified antenna parameters or determined in an implication way;
corresponding antenna parameters are configured independently for different PRBs, wherein the antenna parameters are selected from specified antenna parameters or determined in an implication way;
corresponding antenna parameters are configured independently for different clusters, with different PRBs in one cluster configured with same antenna parameters, wherein the antenna parameters are selected from specified antenna parameters or determined in an implication way; and
wherein the antenna parameters comprise a DM-RS antenna port, and an SCID and a scrambling code initialized value X desired when a DM-RS port sequence is initialized.

18. The system according to claim 10, wherein the newly added TDD special subframe configuration comprises:
- a newly added TDD special subframe configuration is 9, i.e., (DwPTS:GP:UpPTS) =(6:6:2), when a DwPTS of the TDD special subframe uses a normal cyclic prefix;
- a newly added TDD special subframe configuration is 7, i.e., (DwPTS:GP:UpPTS) =(5:5:2), when the DwPTS of the TDD special subframe uses an extended cyclic prefix.

\* \* \* \* \*